(12) United States Patent
Carpenter

(10) Patent No.: US 7,058,433 B2
(45) Date of Patent: Jun. 6, 2006

(54) MECHANISM FOR ERGONOMIC INTEGRATION OF A DIGITAL CAMERA INTO A MOBILE PHONE

(75) Inventor: Kevin Carpenter, Durham, NC (US)

(73) Assignee: Sony Ericsson Mobile Communications AB (SE)

( * ) Notice: Subject to any disclaimer, the term of this patent is extended or adjusted under 35 U.S.C. 154(b) by 400 days.

(21) Appl. No.: 10/702,307

(22) Filed: Nov. 6, 2003

(65) Prior Publication Data
US 2005/0101358 A1  May 12, 2005

(51) Int. Cl.
*H04Q 7/32* (2006.01)

(52) U.S. Cl. .................. 455/575.1; 455/575.3; 455/550.1; 455/90.3; 455/557; 455/556.1; 455/403; 455/566; 379/433.04; 379/433.13; 379/433.01; 379/433.11

(58) Field of Classification Search .......... 455/403, 455/575.1, 575.3, 550.1, 557, 556.1, 500, 455/517, 422.1, 566, 556.2, 90.1, 90.2, 90.3; 379/433.04, 433.13, 428.01, 433.01, 433.11, 379/435; 348/14.01, 14.02
See application file for complete search history.

(56) References Cited

U.S. PATENT DOCUMENTS

2003/0040346 A1 * 2/2003 Fukuda et al. ............. 455/575

2005/0054394 A1 * 3/2005 Sudo ..................... 455/575.3
2005/0096106 A1 * 5/2005 Bennetts et al. ......... 455/575.3

FOREIGN PATENT DOCUMENTS

| EP | 1 335 567 | 8/2003 |
| WO | WO 03/088629 | 10/2003 |

OTHER PUBLICATIONS

Invitation to Pay Additional Fees; Annex to Form PCT/ISA/206—Communication Relating to the Results of the Partial International Search; PCT/US2004/016533 filed May 27, 2004.

* cited by examiner

*Primary Examiner*—Keith Ferguson
(74) *Attorney, Agent, or Firm*—Coats & Bennett, P.L.L.C.

(57) ABSTRACT

An ergonomic clamshell housing for a mobile device with a camera comprises a housing with a hinge mechanism that pivotally connects a display section to a camera section. The hinge mechanism allows the display and camera sections to rotate relative to each other between at least a first folded position and a second folded position. When in the first folded position, the display and camera sections are folded in a side-by-side relation such that the display and camera lens face each other. When in the second folded position, the display and camera sections are folded in a side-by-side relation such that the display and camera lens face away from each other.

37 Claims, 5 Drawing Sheets

MECHANISM FOR ERGONOMIC INTEGRATION OF A DIGITAL CAMERA INTO A MOBILE PHONE

BACKGROUND OF THE INVENTION

The present invention relates to a mobile device, and more particularly to a housing for a mobile device with a built-in digital camera.

In recent years, manufacturers have introduced mobile devices with built-in cameras into the market. One such device, referred to herein as a camera phone, combines a cellular telephone with a camera in a single housing. Consumers may use their camera phones to capture images, send and receive digital images, and/or participate in a video teleconference. Until recently, the demand for mobile communication devices with built-in cameras has been low because such devices have been large and prohibitively expensive. However, due to advances in technology, the size and cost of these devices is decreasing. As such, wireless manufacturers expect the demand for these mobile devices to increase.

To meet the growing demand and to stay competitive in the market, manufacturers regularly explore ways to improve these mobile devices. Areas of focus include reducing the size of the mobile device and designing an ergonomic mobile device that looks, feels, and operates similar to a conventional digital camera. However, these two areas of focus often conflict. For example, smaller conventional camera phones tend to be designed with "clamshell" housings that comprise two pivotally connected sections. When not in use, the two sections close into a compact folded position. This not only positions the camera phone in a highly compact package, but also protects delicate user interfaces, such as the keypad, display, etc. By flipping open the clamshell, the consumer may operate the mobile device as a communication device, a camera, or both.

Because the display typically operates as the viewfinder for the camera, current camera phones with clamshell housings are held in a vertical orientation with the clamshell open when the camera phone operates as a camera. This orientation is awkward for consumers accustomed to compact, horizontally oriented digital cameras. Therefore, while the clamshell design addresses some size concerns, camera phones with conventional clamshell housings do not provide a compact and ergonomic solution when the camera phone operates as a camera. Therefore, there is a need for a mobile device with a clamshell housing that not only provides the desired size benefits of the conventional clamshell design, but also provides an ergonomic housing when the mobile device operates as a camera.

SUMMARY OF THE INVENTION

The present invention relates to an ergonomic clamshell housing for a mobile device with a camera. The mobile device comprises a housing with a hinge mechanism pivotally connecting a first section with first and second sides to a second section with first and second sides. The hinge mechanism allows the first and second sections to rotate relative to each other between at least a first folded position and a second folded position. When in the first folded position, the first and second sections are folded in a side-by-side relation such that the first sides of each section face each other. When in the second folded position, the first and second sections are folded in a side-by-side relation such that the second sides of each section face each other. In a preferred embodiment, the housing is used for a mobile device where the first section includes a display and the second section includes a camera lens. In this embodiment, the display and the camera lens face each other when the mobile device is positioned in the first folded position and face away from each other when the mobile device is positioned in the second folded position.

DETAILED DESCRIPTION OF THE INVENTION

Figure 1A:
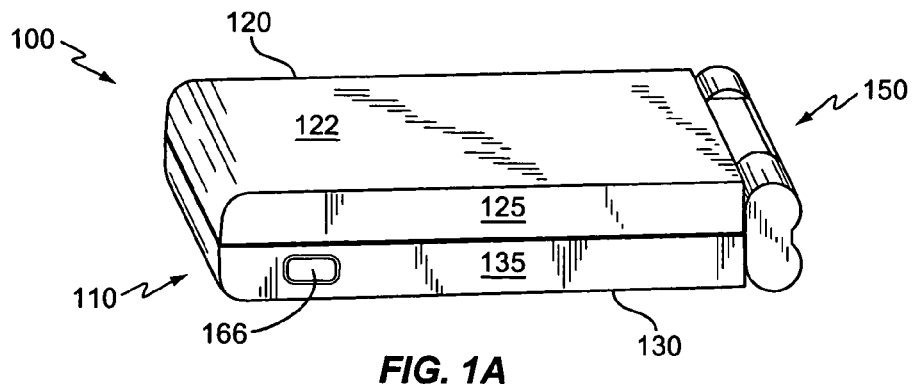
FIGS. 1A and 1B illustrate an exemplary mobile device in a first folded position.

FIGS. 1–4 illustrate an exemplary mobile device 100 according to the present invention. Mobile devices utilized with the present invention may comprise any known mobile communication device or portable electronic device that includes a camera. Such mobile devices include, but are not limited to, cellular telephones, persona data assistants (PDA), personal communication service (PCS) devices, palm-top computers, and the like.

Mobile device 100 comprises a housing 110, which includes a display section 120, a camera section 130, and a double hinge 150. Display section 120 includes multiple sides, such as a front 122, a back 124, and connecting sides 125. In exemplary embodiments, a display 126 and a speaker 128 are disposed on the back 124 of display section 120. Similarly, camera section 130 includes multiple sides, such as a front 132, a back 134, and sides 135. In exemplary embodiments, a camera lens 136 is disposed on the back 134 of camera section 130. Double hinge 150 pivotally connects display section 120 to camera section 130.

Figure 3:
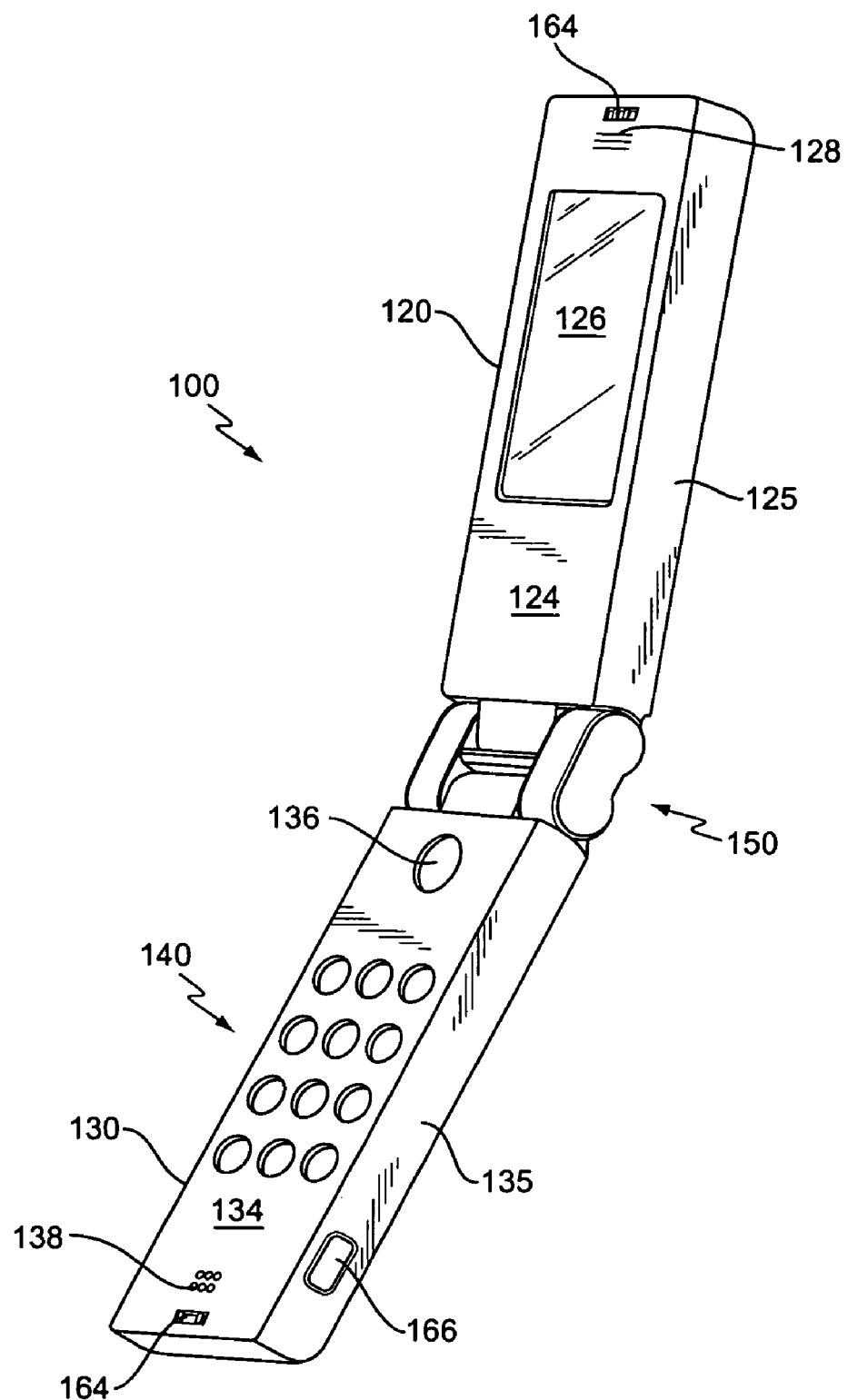
FIG. 3 illustrates the mobile device of FIG. 1 in an unfolded position.
Figure 4:
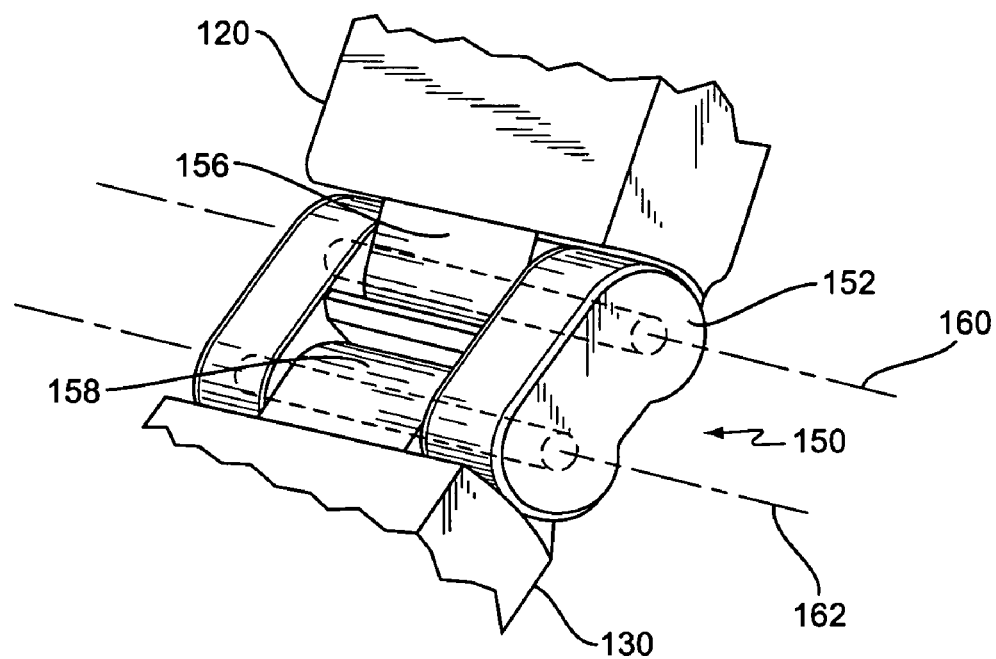
FIG. 4 illustrates an exemplary double hinge according to the present invention.

Referring to FIGS. 3 and 4, double hinge 150 comprises a hinge member 152 a first hinge connector 156, and a second hinge connector 158. The first hinge connector 156 fixedly connects to display section 120, while the second hinge connector 158 fixedly connects to camera section 130. In exemplary embodiments, the first and second hinge connectors 156, 158 may be integrally molded with the display and camera sections 120, 130, respectively. The first hinge connector 156 pivotally connects the display section 120 to the hinge member 152 so as to rotate about a first axis of rotation 160, thus forming a first hinge. Similarly, the second hinge connector 158 pivotally connects the camera section 130 to the hinge member 152 so as to rotate about a second axis of rotation 162, thus forming a second hinge. In exemplary embodiments, double hinge 150 allows each section 120, 130 to rotate between approximately 0° and 180°.

Figure 1B:
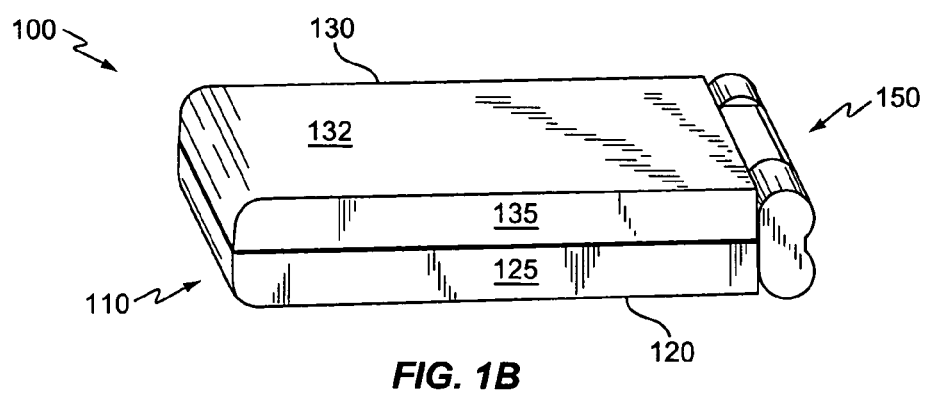
Figure 2A:
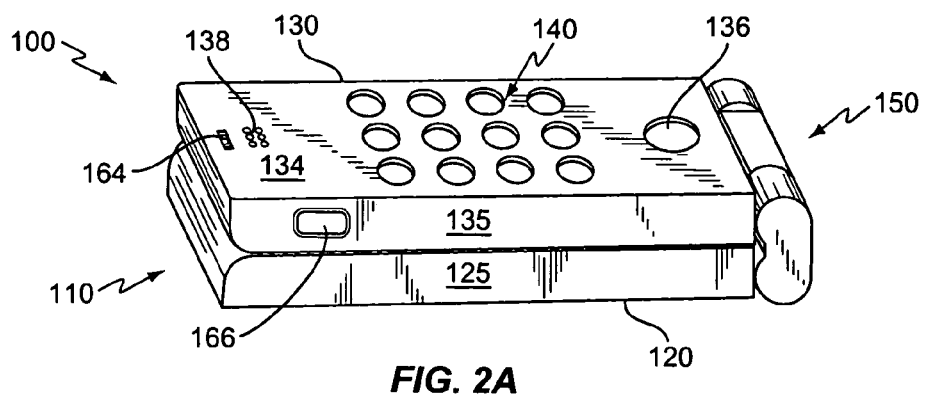
FIGS. 2A and 2B illustrate the mobile device of FIG. 1 in a second folded position.
Figure 2B:
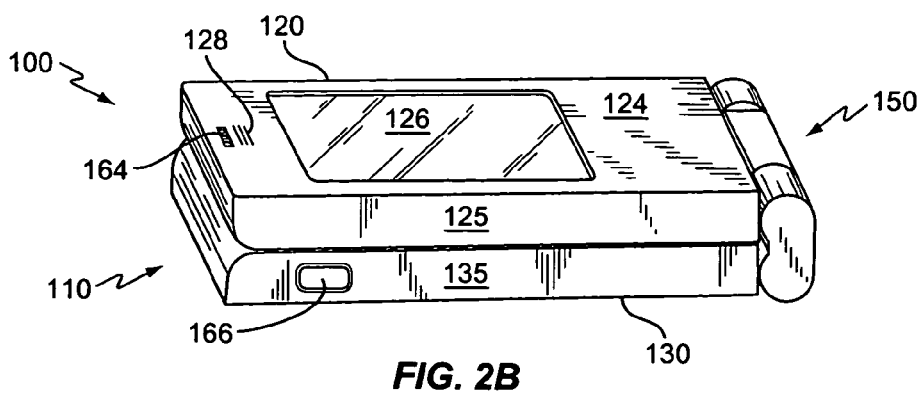

As shown in FIGS. 1, 2A, and 2B, double hinge 150 allows the display and camera sections 120, 130 to rotate relative to each other from a first folded position to a second folded position. In the first folded position (FIGS. 1A and 1B), the backs 124, 134 of the display and camera sections 120, 130, respectively, are folded in a side-by-side relation such that the display 126 and camera lens 136 face each other. In this position, the mobile communication device 100 typically operates in a stand-by mode, as discussed further below. The camera lens 136, display 126, and keypad 140 are protected. Mobile device 100 may include any known means to secure mobile device 100 in the first folded position. For example, a latch 164 may be included on the housing 110 to secure the display section 120 to the camera section 130 when the mobile device 100 is oriented in the first folded position. Pressing a latch release button 166 releases the latch and allows a user to rotate the first and second sections 120, 130 about double hinge 150.

In the second folded position (FIGS. 2A and 2B), the fronts 126, 136 of the display and camera sections 120, 130 are folded in a side-by-side relation such that the display 126 and the camera lens 136 face in opposite directions. In this position, the mobile communication device 100 typically operates in a camera mode, as discussed further below. As with the first folded position, mobile device 100 may include any known means, such as a latch, to secure the mobile device 100 in the second folded position.

Mobile communication device 100 may also be positioned in one or more unfolded positions, as shown in FIG. 3. As detailed further below, exemplary embodiments of the present invention use the unfolded position(s) for communication operations. To position the mobile device 100 in an unfolded position, the user rotates the display and camera sections 120, 130 relative to each other until a desired angular separation is achieved. In exemplary embodiments, the desired angular separation for an unfolded mobile device 100 may range between 150° and 170°, and is preferably approximately 160°.

A user may rotate one or both housing sections 120, 130 to achieve the desired angular separation. For example, the user may rotate display section 120 by 70° and camera section 130 by 90° to achieve the 160° angular separation. This example is for illustrative purposes only and is not to be construed as limiting the present invention. Those skilled in the art will recognize that any combination of angles may be used to achieve the desired angular separation.

In exemplary embodiments, double hinge 150 may also include a detent or index mechanism to hold the mobile device 100 open at the desired unfolded position, as is well known in the art. The first and second hinges may be spring loaded so that the display and camera sections 120, 130 swing open to the mechanical detent when the latch securing the housing sections 120, 130 is released. The detent allows mobile device 100 to maintain the unfolded position until the user either returns the mobile device to the first folded position, or until the user further rotates the display and/or camera sections 120, 130 past the unfolded position and into the second folded position.

Figure 5:
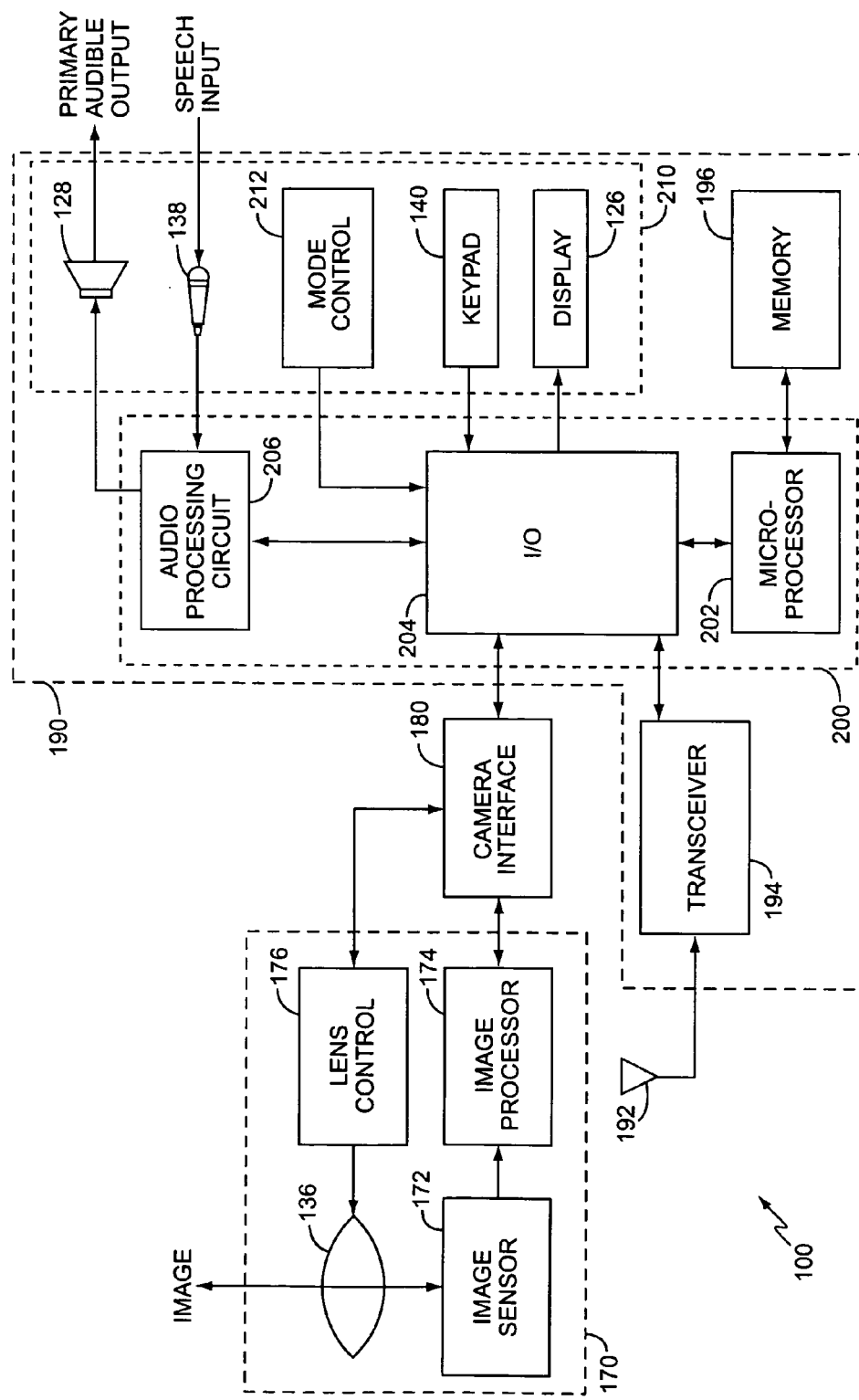
FIG. 5 illustrates a block diagram of an exemplary mobile device according to the present invention.

Turning now to FIG. 5, the general operation of an exemplary mobile device 100 will be described. FIG. 5 illustrates a block diagram for an exemplary mobile device 100 according to the present invention. Mobile device 100 comprises a camera assembly 170, camera and graphics interface 180, and a communication circuit 190. Camera assembly 170 includes camera lens 136, image sensor 172, image processor 174, and lens control 176. Camera lens 136, comprising a single lens or a plurality of lenses, collects and focuses light onto image sensor 172 in response to control signals from lens control 176. Lens control 176 may control camera lens 136 by, for example, changing the focus of camera lens 136 in response to an automatic focus function or in response to user input. Image sensor 172 captures images formed by light collected and focused by camera lens 136. Image sensor 172 may be any conventional image sensor 172, such as a charge-coupled device (CCD) or a complementary metal oxide semiconductor (CMOS) image sensor. Image processor 174 processes raw image data captured by image sensor 172 for subsequent storage in memory 196, output to a display 126, and/or for transmission by communication circuit 190. The image processor 174 may be a conventional digital signal processor programmed to process image data, which is well known in the art.

Image processor 174 interfaces with communication circuit 190 via camera and graphics interface 180. Communication circuit 190 comprises antenna 192, transceiver 194, memory 196, microprocessor 202, input/output circuit 204, audio processing circuit 206, and user interface 210. Transceiver 194 is coupled to antenna 192 for receiving and transmitting signals. Transceiver 192 is a fully functional cellular radio transceiver, which may operate according to any known standard, including the standards known generally as the Global System for Mobile Communications (GSM), TIA/EIA-136, cdmaOne, cdma2000, UMTS, and Wideband CDMA.

Microprocessor 202 controls the operation of mobile device 100, including transceiver 194, according to programs stored in memory 196. The control functions may be implemented in a single microprocessor, or in multiple microprocessors. Suitable microprocessors may include, for example, both general purpose and special purpose microprocessors and digital signal processors. Memory 196 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 202.

Figure 6:
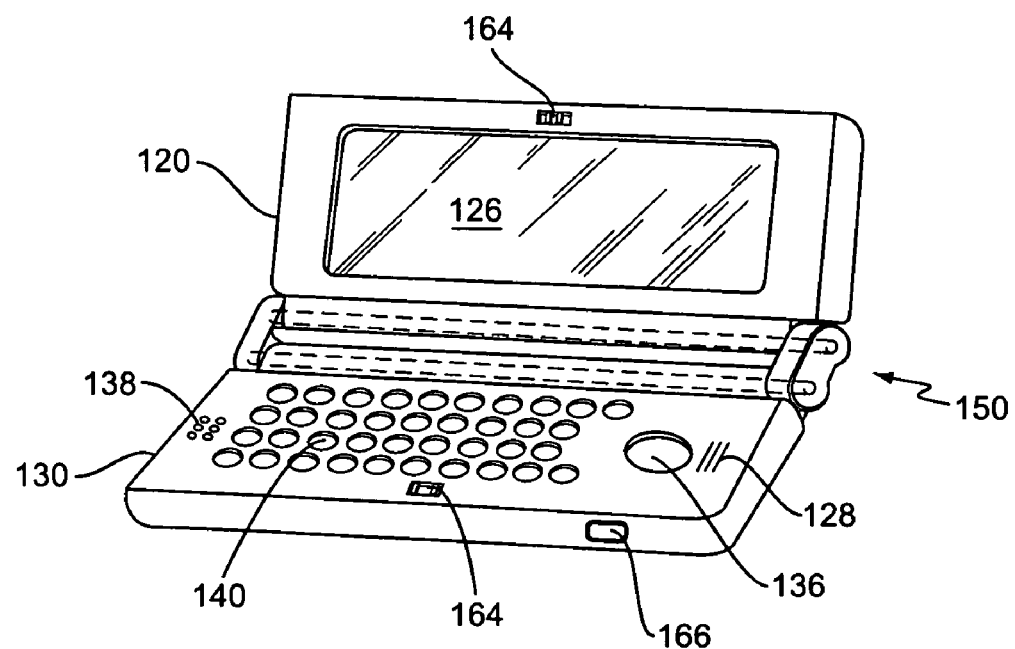
FIG. 6 illustrates an alternate embodiment of a mobile device of the present invention.

Input/output circuit 204 interfaces microprocessor 202 with image processor 174 of camera assembly 170 via camera and graphics interface 180. Camera and graphics interface 180 may also interface image processor 174 with user interface 210 according to any method known in the art. In addition, input/output circuit 204 interfaces microprocessor 202, transceiver 194, audio processing circuit 206, and user interface 210 of communication circuit 190. User interface 210 includes a display 126, speaker 128, microphone 138, and keypad 140. Display 126, disposed on the back 124 of display section 120, allows the operator to see dialed digits, images, called status, menu options, and other service information. Keypad 140 includes an alphanumeric keypad and may optionally include a navigation control, such as joystick control (not shown) as is well known in the art. Further, keypad 140 may comprise a full keyboard, such as those used with palmtop computers, as shown in FIG. 6. Keypad 140 allows the operator to dial numbers, enter commands, and select options.

Microphone 138 converts the user's speech into electrical audio signals. Audio processing circuit 206 accepts the analog audio inputs from microphone 138, processes these signals, and provides the processed signals to transceiver 194 via input/output 204. Audio signals received by transceiver 194 are processed by audio processing circuit 206. The basic analog output signals produced by processed audio processing circuit 206 are provided to speaker 128.

Speaker 128 then converts the analog audio signals into audible signals that can be heard by the user.

User interface 210 may also include mode control 212. Mode control 212 selectively activates an operational mode for mobile device 100 in response to user input and/or the orientation of the mobile device housing 110. The operational modes may include, for example, a stand-by mode, a communication mode, and a camera mode. A stand-by mode is defined as the mode where mobile device 100 operates in a reduced power mode while waiting for user input and/or for communication signals from a wireless network. A communication mode is defined as the mode where mobile device 100 operates as a wireless communication device capable of transmitting and receiving data in a wireless communication system. A camera mode is defined as the mode where camera phone 100 selectively captures, displays, stores, and/or manipulates images.

In exemplary embodiments, the operational mode of mobile device 100 may be determined by the orientation of the mobile device housing 110. In these embodiments, mode control 212 detects the angular position of housing sections 120, 130 relative to one another and activates the appropriate mode based on the detected position. For example, mode control 212 may activate a stand-by mode when mobile device 100 is positioned in the first folded position, a communication mode when mobile device 100 is positioned in the unfolded position, and a camera mode when mobile device 100 is positioned in the second folded position. Alternatively, the user may select the operational mode of mobile device 100 from a menu on display 126. Further, some embodiments may allow a user to select a combination communication and camera mode, for example, by orienting the mobile device 100 in the unfolded position and selecting a video teleconference option from a menu on the display 126.

Those skilled in the art will appreciate that one or more elements shown in FIG. 5 may be combined. For example, while the camera and graphics interface 180 is shown as a separated component in FIG. 5, it will be understood that camera and graphics interface 180 may be incorporated with input/output circuit 204. Further, microprocessor 202, input/output circuit 204, audio processing circuit 206, and/or memory 196 may be incorporated into a specially designed application-specific integrated circuit (ASIC) 200.

Figure 7A:
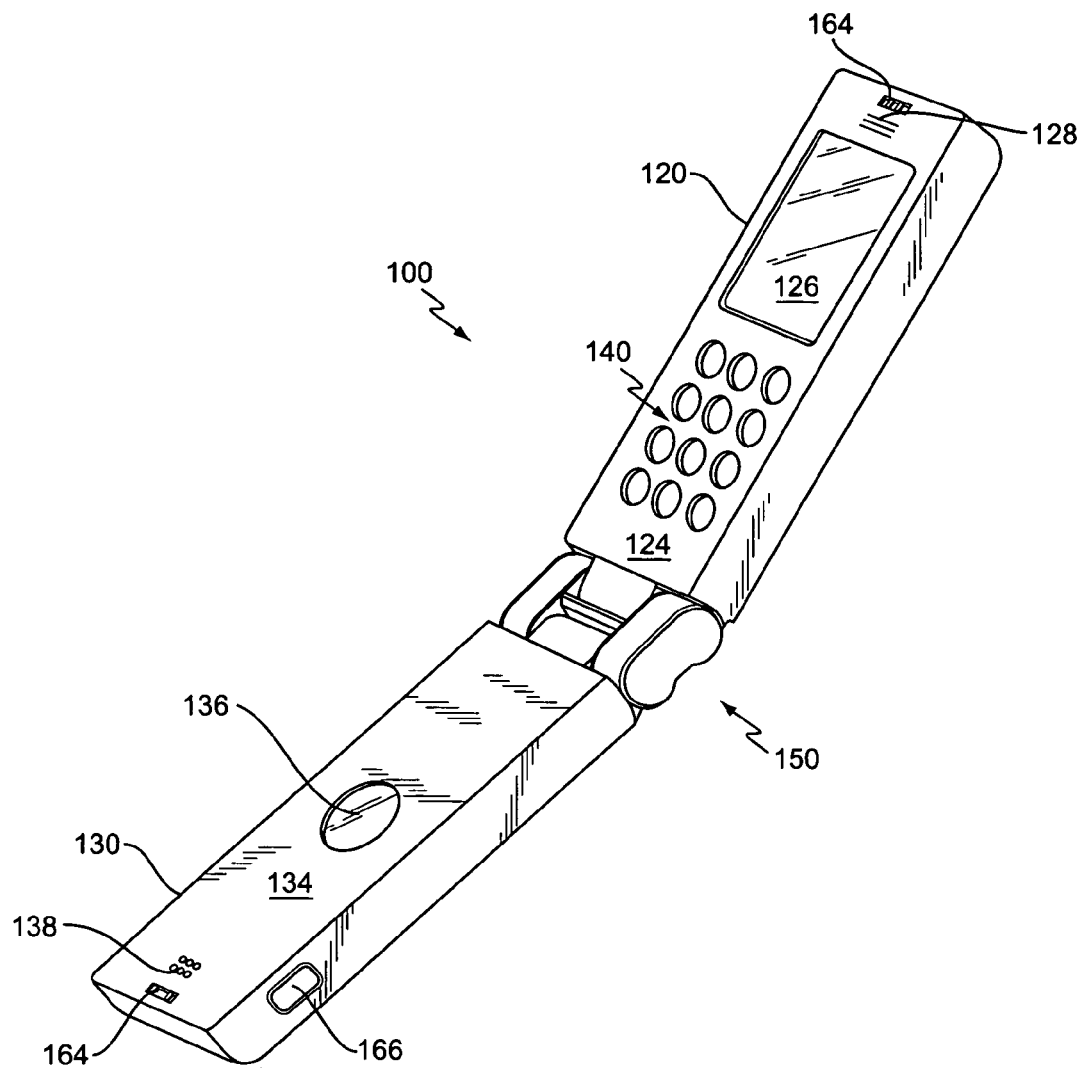
FIGS. 7A and 7B illustrate another alternate embodiment of the mobile device of the present invention.
Figure 7B:
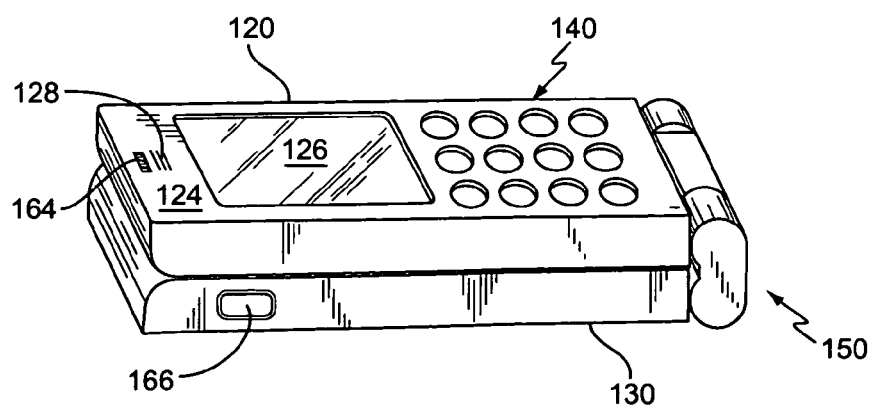

As mentioned above, the present invention applies to any mobile device that includes a built-in camera. As such, the present invention is not limited to the specific configurations shown in FIGS. 1–4. For example, while FIGS. 1–4 show a double hinge 150 that pivotally connects to a bottom side of display section 120 and to a top side of camera section 130, the present invention is not limited to this construction. For example, mobile device 100 may comprise a palmtop computer, as shown in FIG. 6. In this embodiment, double hinge 150 pivotally connects a connecting side 125 of display section 120 to a connecting side 135 of camera section 130. Further, keypad 140 and other user interface elements, such as speaker 128 and microphone 138 may be located anywhere on housing 110. For example, keypad 140 may be located proximate the display 126 on display section 120, as shown in FIGS. 7A and 7B.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile communication device comprising:
   a housing having first and second sections pivotally connected by a hinge mechanism that allows rotation of said first and second sections relative to one another between at least a first folded position and a second folded position;
   a display disposed on said first section;
   a camera lens disposed on said second section;
   wherein in said first folded position, said first and second sections of said housing are folded in side by side relation with said display and said camera lens facing towards each other; and
   wherein in said second folded position, said first and second sections of said housing are folded in side by side relation with said display and said camera lens facing away from each other.

2. The mobile communication device of claim 1 wherein the hinge mechanism comprises first and second hinges.

3. The mobile communication device of claim 2 wherein the first section connects to the first hinge and the second section connects to the second hinge.

4. The mobile communication device of claim 2 wherein the hinge mechanism further comprises a hinge member, a first hinge connector integrally molded with the first section, and a second hinge connector integrally molded with the second section.

5. The mobile communication device of claim 4 wherein the first and second hinge connectors pivotally connect to the hinge member.

6. The mobile communication device of claim 1 wherein the hinge mechanism has first and second axes of rotation.

7. The mobile communication device of claim 6 wherein the first section rotates about the first axis of rotation and wherein the second section rotates about the second axis of rotation.

8. The mobile communication device of claim 6 wherein the hinge mechanism further comprises a first hinge connector integrally molded with the first section and a second hinge connector integrally molded with the second section.

9. The mobile communication device of claim 8 wherein the first hinge connector rotates about the first axis of rotation and wherein the second hinge connector rotates about the second axis of rotation.

10. The mobile communication device of claim 1 wherein said first and second sections are movable to at least one unfolded position.

11. The mobile communication device of claim 10 wherein the first section is angularly spaced between 150° and 170° from the second section when said first and second sections are positioned in the at least one unfolded position.

12. The mobile communication device of claim 11 wherein the first section is angularly spaced approximately 160° from the second section when said first and second sections are positioned in the at least one unfolded position.

13. The mobile communication device of claim 1 further comprising a latch to secure the first and second sections when said housing is positioned in said first folded position.

14. The mobile communication device of claim 1 wherein the hinge mechanism pivotally connects a side of the first section to a side of the second section.

15. The mobile communication device of claim 14 wherein the hinge mechanism pivotally connects a bottom side of the first section to a top side of the second section.

16. The mobile communication device of claim 1 further comprising a keypad disposed on said second section proximate said camera lens.

17. The mobile communication device of claim 1 further comprising a keypad disposed on said first section proximate said display.

18. The mobile communication device of claim 1 further comprising a mode control circuit disposed within at least one of the first and second sections.

19. The mobile communication device of claim 18 wherein the mode control circuit configures the mobile communication device to operate in a camera mode when said first and second sections are positioned in said second folded position.

20. The mobile communication device of claim 18 wherein the mode control circuit configures the mobile communication device to operate in a standby mode when said first and second sections are positioned in said first folded position.

21. The mobile communication device of claim 18 wherein the mode control circuit configures the mobile communication device to operate in a communication mode when said first and second sections are positioned in at least one unfolded position.

22. The mobile communication device of claim 1 wherein said display functions as a viewfinder when said first and second sections are positioned in at least one unfolded position.

23. The mobile communication device of claim 1 wherein the display functions as a display when said first and second sections are positioned in at least one unfolded position.

24. The mobile communication device of claim 1 wherein said display functions as a viewfinder when said housing is positioned in said second folded position.

25. The mobile communication device of claim 1 wherein the mobile communication device comprises a cellular telephone.

26. The mobile communication device of claim 1 wherein the mobile communication device comprises a palmtop computer.

27. A method of assembling a housing for a mobile communication device comprising:
pivotally connecting first and second housing sections with a double hinge mechanism that allows rotation of said first and second housing sections relative to one another between at least a first folded position and a second folded position;
positioning a display on the first housing section;
positioning a camera lens on the second housing section;
wherein in said first folded position, said first and second housing sections are folded in side by side relation with said display and said camera lens facing towards each other; and
wherein in said second folded position, said first and second housing sections are folded in side by side relation with said display and said camera lens facing away from each other.

28. The method of claim 27 wherein the double hinge mechanism comprises first and second hinges and wherein pivotally connecting said first and second housing sections with said double hinge mechanism comprises connecting the first housing section to the first hinge and connecting the second housing section to the second hinge.

29. The method of claim 27 wherein the double hinge mechanism has first and second axes of rotation, the method further comprising rotating the first housing section about the first axis of rotation and rotating the second housing section about the second axis of rotation to position the first and second housing sections in the first and second folded positions.

30. The method of claim 27 further comprising rotating the first and second housing sections relative to one another to at least one unfolded position.

31. The method of claim 30 wherein rotating the first and second housing sections relative to one another comprises rotating the first and second housing sections relative to one another to an angular spacing of between 150° and 170°.

32. The method of claim 31 wherein rotating the first and second housing sections relative to one another to the angular spacing of between 150° and 170° comprises rotating the first and second housing sections relative to one another to an angular spacing of approximately 160°.

33. The method of claim 27 further comprising securing the first housing section to the second housing section when the first and second housing sections are positioned in the first folded position.

34. The method of claim 27 wherein pivotally connecting the first and second housing sections with the double hinge mechanism comprises pivotally connecting a side of the first housing section to a side of the second housing section with the double hinge mechanism.

35. The method of claim 34 wherein pivotally connecting the side of the first housing section to the side of the second housing section with the double hinge mechanism comprises pivotally connecting a bottom side of the first housing section to a bottom side of the second housing section with the double hinge mechanism.

36. The method of claim 27 further comprising positioning a keypad on said second housing section proximate the camera lens.

37. The method of claim 27 further comprising positioning a keypad on said first housing section proximate the display.

* * * * *